Patented Sept. 19, 1950

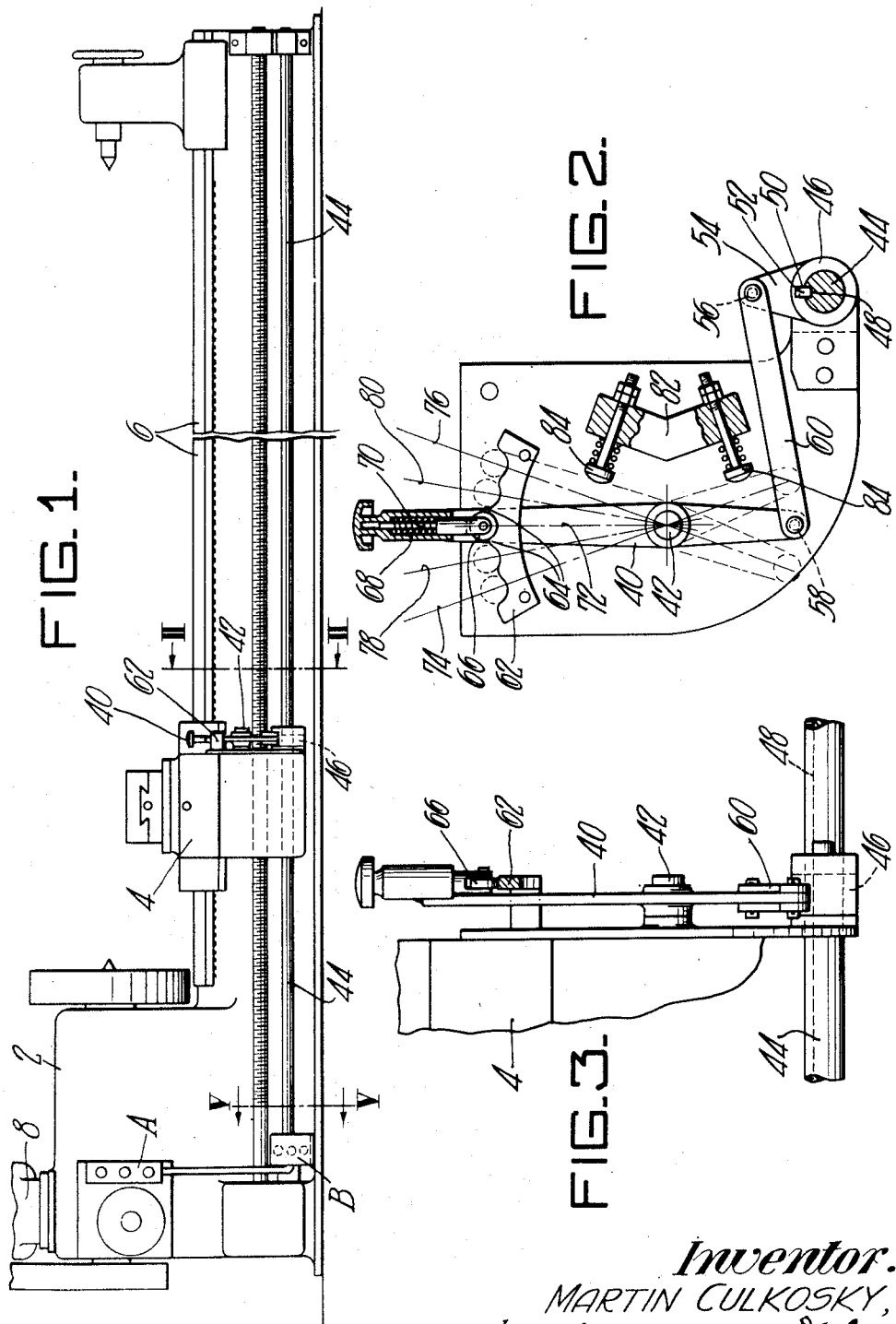

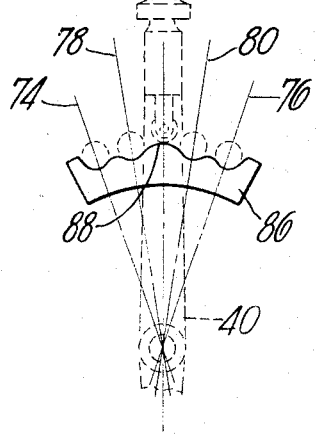
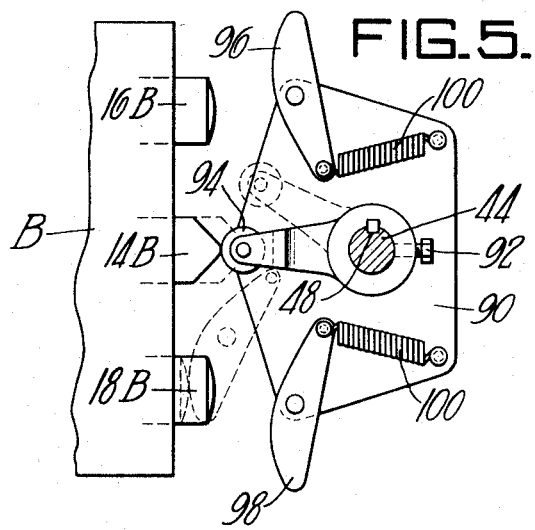
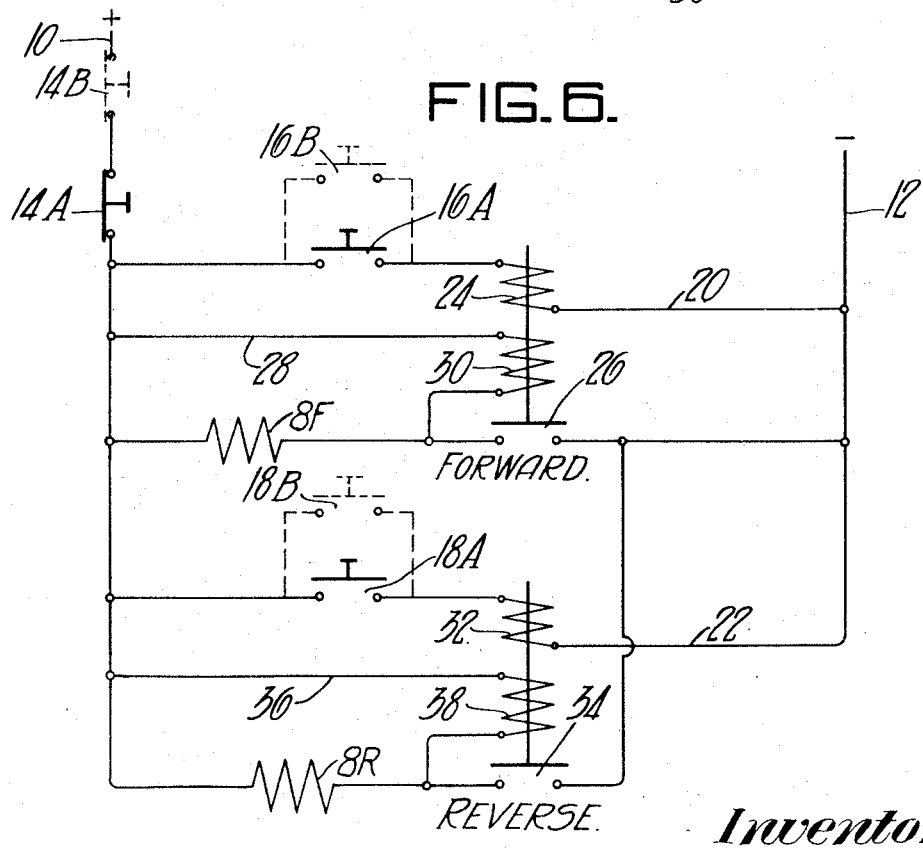

2,522,779

UNITED STATES PATENT OFFICE 2,522,779

LATHE CONTROL

Martin Culkosky, Gary, Ind.

Application September 27, 1945, Serial No. 618,934

3 Claims. (Cl. 318—543)

1

This invention relates to a lathe control and more particularly to such a control which enables the operator to have the operation of the machine under his control at all times. As is well known, a lathe is provided with a stationary headstock and a tool carriage which travels along the bed of the lathe as the work progresses. The lathe operator stands close to the carriage where he can best observe the work. In present lathes the control is normally mounted on the stationary headstock and when the operator wishes to change the operation of the lathe, it is necessary for him to leave his position at the carriage and walk to a push button control on the headstock. Under certain conditions it is necessary for the operator to inchmeal the work and to do this he must station an assistant at the push buttons and give him instructions as to how he wishes the lathe to be operated. This method is slow and unsatisfactory. In case of emergency a great deal of damage can occur in the time it takes the operator to reach the push buttons on the headstock. In case the operator's clothing is caught in the work, it is impossible for him to stop the machine. In order to overcome these objections, some machines have the electrical control mounted on the carriage, but if this is done, it is necessary to have reels for the wiring. This has proved unsatisfactory and hazardous since the wires are exposed to damage from chips, falling tools, and the like.

It is therefore an object of my invention to provide a control which is close to the work and the operator.

Another object is to provide such a control which is quick acting, simple, and rugged in construction.

These and other objects will be more apparent after referring to the following specification and attached drawings, in which:

Figure 1 is an elevation of the lathe with the control attached thereto;

Figure 2 is a view taken on the line II—II of Figure 1, but showing only the control;

Figure 3 is an end view of Figure 2;

Figure 4 shows a second embodiment of the cam of Figure 2;

Figure 5 is a view taken on the line V—V of Figure 1, but showing only the control; and Figure 6 is a schematic wiring diagram of the control.

Referring more particularly to the drawings, the reference numeral 2 indicates the stationary headstock of a lathe. A carriage 4 travels along the lathe bed 6 toward and away from the headstock 2. Lathe motor 8 is mounted on the head-

2 stock 2 in the usual manner and is controlled from a switch control box A which houses three push button type switches, the switches springing to their normal position when pressure is removed from the buttons. A similar control box B is mounted on the headstock adjacent the carriage 4.

As shown in Figure 6, power for motor 8 is supplied through lines 10 and 12. Control box A houses three push button switches 14A, 16A and 18A, which are connected respectively with switches 14B, 16B and 18B in control box B. Switches 14A and 14B are located in the power line 10 and are both normally closed. Switches 16A and 16B are located in the forward control circuit 20 and are normally open. Switches 18A and 18B are located in reverse control circuit 22 and are also normally open. For forward operation of motor 8, either switch 16A or 16B is pushed to close the circuit 20. Current flowing through circuit 20 energizes coil 24, which closes switch 26 so that the forward power circuit 28 is closed. This energizes coil 30 which acts to hold switch 26 closed as long as current flows through circuit 28. At the same time the forward contactor relay coil 8F is energized, thus closing contacts (not shown) to cause motor 8 to rotate in a forward direction. Thus, when pressure is relieved from push button switches 16A and 16B, they will return to their normally open position, but motor 8 will continue to rotate in a forward direction. To break the circuit, the buttons of either switch 14A or 14B is pushed. This deenergizes coil 30, thus permitting switch 26 to spring to the normally open position. For reverse operation of motor 8, either switch 18A or 18B is pushed to close the reverse control circuit 22. Current flowing through circuit 22 energizes coil 32, which closes switch 34 so that the reverse power circuit 36 is closed. This energizes coil 38, which acts to hold switch 34 closed as long as current flows through power circuit 36. At the same time the reverse contactor relay coil 8R is energized, thus closing contacts (not shown) to cause motor 8 to rotate in the reverse direction. To break the circuit, the push button of either switch 14A or 14B is pushed. This deenergizes coil 38, thus permitting the switch 34 to spring to its normally open position.

The operator controls the operation of the switches in control box B from a lever 40 which is pivotally connected by means of a bolt 42 to that end of the carriage 4 remote from the headstock. The carriage 4 travels along a rotatable shaft 44 which has a collar 46 slidably mounted thereon. The shaft 44 is provided with a keyway 48 extending along the length thereof and collar 46 is provided with a keyway 50 for receiving a gib-key 52 which slides in the keyway 48. Collar 46 has an extension 54 which has a bolt hole 56 in its upper end and the bottom of lever 40 has a similar hole 58. A link 60, having holes at each end, is pivotally connected to the lever 40 and collar 46 by means of pins or bolts passing through the holes in the link 60, lever 40 and collar 46. A cam 62 is mounted on the carriage adjacent the lever 40 and is provided with two high spots 64. The lever 40 carries a cam follower 66 which is slidably mounted in an opening 68 in the lever 40. A spring 70 in the opening presses the cam follower 66 downwardly against the cam surface. By pushing the lever 40 into position 72 between the high spots 64, the push button of switch 14B is held down and the circuit to motor 8 cannot be closed. When the lever 40 is moved to the extreme left position 74, the lathe motor 8 will be reversed as will be explained hereinafter. When swung to the extreme right position 76 the lathe motor 8 will be rotated in the forward direction. When the lever 40 is in either of the intermediate positions 78 or 80, switches 14B, 16B and 18B will all be in their normal position and the motor 8 can be controlled from either control box A or B. A bracket 82 with spring stops 84 mounted adjacent the lever 40 on the carriage 4 pushes the lever back into either of the neutral positions 78 or 80 after the operator has pushed the lever to position 74 or 76 and released the handle. If desired, a cam 86 shaped as shown in Figure 4 may be substituted for cam 62. In this cam there is only one central high point 88 so that the lever 40 cannot be latched in position 72. With this cam the lever 40 will always drift to either of the two neutral positions 78 or 80 when the lever 40 is released. Adjacent the control box B a collar 90 is adjustably mounted on the shaft 44 and held in place thereon by means of set screws 92. Collar 90 has a roller 94 mounted thereon which contacts the push button of switch 14B. Pivotally mounted on collar 90 are fingers 96 and 98 which depress the buttons of switches 16B and 18B respectively. Springs 100 are attached to the fingers to prevent them from exerting a crushing pressure on the buttons.

The operation of the device is as follows:

Assuming that the lathe motor 8 is in operation in a forward direction and that the operator is in a position near the carriage 4 which is traversing the work, he will be in a position to move lever 40 as desired. If the operator desires to stop the motor he moves the lever 40 to position 72. This rotates collar 46 and shaft 44, which in turn rotates collar 90 to cause roller 94 to depress the button of switch 14B, thus stopping rotation of motor 8. When the operator wishes to start the motor in a forward direction, he moves the lever 40 to position 76. This rotates collar 46 and shaft 44 which in turn causes collar 90 to rotate until finger 96 depresses the push button of switch 16B. As soon as lever 40 is released, it moves to neutral position 80, thus permitting operation of the motor 8 from either of control boxes A or B. To reverse the operation of the motor 8, lever 40 is moved from position 80 to position 74, thus causing finger 98 to depress push button 18B. As the carriage 4 moves along shaft 44, it moves the collar 46 therealong. Thus it will be seen that the operator can readily control the operation of motor 8 from a position adjacent the carriage 4 so that in case of accident the motor can be quickly stopped. Likewise no difficulty is encountered in inchmealing the work without the assistance of a helper.

While two embodiments of my invention have been shown and described, it will be apparent that other adaptations and modifications may be made without departing from the scope of the following claims.

I claim:

1. In a machine tool having a stationary part and a carriage movable along a rotatable shaft the combination including a motor, a switch mounted on the stationary part for controlling the operation of said motor, said switch having a plurality of push buttons, a collar slidably mounted on said shaft for rotation therewith, a lever mounted on said carriage and connected to rotate said collar, a cam on said carriage adjacent said lever, a cam follower on said lever bearing against said cam, said cam and follower cooperating to hold the lever in adjusted position, a collar adjacent said switch mounted on said shaft for movement therewith, and a plurality of arms on said last named collar, each adapted to contact one of the push buttons when the shaft is rotated.

2. In a machine tool having a stationary part and a carriage movable along a rotatable shaft the combination including a motor, a three-way push-button switch mounted on the stationary part for controlling the operation of said motor, a collar slidably mounted on said shaft for rotation therewith, a lever mounted on said carriage and connected to rotate said collar, a cam on said carriage adjacent said lever, a cam follower on said lever bearing against said cam, said cam and follower cooperating to hold the lever in adjusted position, a collar adjacent said switch mounted on said shaft for movement therewith, a central arm on said last named collar adapted to contact the center push button, a pair of arms pivotally mounted on said last named collar one on each side of the central arm adapted to contact the outer push buttons, a spring attached to each of the pivoted arms for controlling the pressure of the arm on its associated push button.

3. A switch actuator for a three-way push button switch comprising a shaft, a collar adjacent said switch mounted on said shaft for movement therewith, a central arm on said last named collar adapted to contact the center push button, a pair of arms pivotally mounted on said last named collar one on each side of the central arm adapted to contact the outer push buttons, and a spring attached to each of the pivoted arms for controlling the pressure of the arm on its associated push button.

MARTIN CULKOSKY.

REFERENCES CITED

The following references are of record in the file of this patent:

UNITED STATES PATENTS

| Number | Name | Date |
|---|---|---|
| 1,373,410 | Charles | Apr. 5, 1921 |
| 1,501,723 | Randolph | July 15, 1924 |
| 1,504,519 | Search | Aug. 12, 1924 |
| 2,171,267 | Doty | Aug. 29, 1939 |
| 2,336,425 | Shenton | Dec. 7, 1943 |
| 2,368,408 | Brooking | Jan. 30, 1945 |